US009955075B2

(12) United States Patent
Aoshima

(10) Patent No.: US 9,955,075 B2
(45) Date of Patent: Apr. 24, 2018

(54) INFORMATION TERMINAL, POWER SAVING METHOD IN INFORMATION TERMINAL DETECTING PROBABILITY OF PRESENCE OF A HUMAN OR CHANGE IN POSITION, AND RECORDING MEDIUM WHICH RECORDS PROGRAM

(75) Inventor: Takashi Aoshima, Shizuoka (JP)

(73) Assignee: NEC Platforms, Ltd., Kawasaki-shi, Kanagawa (JP)

(*) Notice: Subject to any disclaimer, the term of this patent is extended or adjusted under 35 U.S.C. 154(b) by 715 days.

(21) Appl. No.: 13/981,217

(22) PCT Filed: Jan. 20, 2012

(86) PCT No.: PCT/JP2012/051733
§ 371 (c)(1),
(2), (4) Date: Jul. 23, 2013

(87) PCT Pub. No.: WO2012/102359
PCT Pub. Date: Aug. 2, 2012

(65) Prior Publication Data
US 2013/0300874 A1  Nov. 14, 2013

(30) Foreign Application Priority Data

Jan. 28, 2011 (JP) .................. 2011-016186

(51) Int. Cl.
H04N 5/232 (2006.01)
H04W 52/02 (2009.01)
(Continued)

(52) U.S. Cl.
CPC ....... *H04N 5/23241* (2013.01); *G06F 1/3231* (2013.01); *H04W 52/0254* (2013.01);
(Continued)

(58) Field of Classification Search
None
See application file for complete search history.

(56) References Cited

U.S. PATENT DOCUMENTS 7,519,200 B2 * 4/2009 Gokturk ............ G06F 17/30253
382/118
2002/0080132 A1  6/2002 Dai et al.
(Continued)

FOREIGN PATENT DOCUMENTS

CN  1987720 A  6/2007
CN  101196990 A  6/2008
(Continued)

OTHER PUBLICATIONS

Japanese Office Action dated May 8, 2013 in corresponding Japanese Patent Application No. 2011-016186.
(Continued)

*Primary Examiner* — Edemio Navas, Jr.
(74) *Attorney, Agent, or Firm* — Sughrue Mion, PLLC

(57) ABSTRACT

[Problems to be solved] To provide an information terminal, a power saving method in the information terminal and a recording medium which records a program which are capable of efficiently suppressing power consumption related to human detection.
[Solution] A human detector performs human detection processing using a captured image by a camera and notifies a control unit of the detection result. Various sensors, an RF unit and a position information detector acquire information related to a change in a position of the information terminal and notify the control unit. The control unit performs power control for the camera on the basis of at least one of the human detection processing result and the information related to the change in the position of the information terminal.

9 Claims, 10 Drawing Sheets

(51) Int. Cl.
*G06F 1/32* (2006.01)
*H04M 1/02* (2006.01)

(52) U.S. Cl.
CPC ........ *H04M 1/0264* (2013.01); *Y02B 60/1289* (2013.01); *Y02B 60/50* (2013.01)

(56) References Cited

U.S. PATENT DOCUMENTS

| | | | |
|---|---|---|---|
| 2003/0005341 A1 | 1/2003 | Terunuma | |
| 2003/0058492 A1* | 3/2003 | Wakiyama | G06K 9/00597 359/20 |
| 2007/0192910 A1* | 8/2007 | Vu | B25J 5/007 700/245 |
| 2008/0231763 A1* | 9/2008 | Estevez | H04N 9/3194 348/744 |
| 2008/0234935 A1* | 9/2008 | Wolf | G01C 21/16 701/472 |
| 2009/0258667 A1 | 10/2009 | Suzuki et al. | |
| 2010/0226487 A1* | 9/2010 | Harder | G06F 1/325 379/202.01 |
| 2011/0261066 A1* | 10/2011 | Tsukamoto | H04N 1/644 345/589 |
| 2012/0147531 A1* | 6/2012 | Rabii | H04W 52/0254 361/679.01 |
| 2013/0057694 A1* | 3/2013 | Petricoin, Jr. | H04N 7/18 348/155 |

FOREIGN PATENT DOCUMENTS

| | | |
|---|---|---|
| JP | 2003-015783 A | 1/2003 |
| JP | 2006-245879 A | 9/2006 |
| JP | 2009-267809 A | 11/2009 |
| JP | 2010-032851 A | 2/2010 |
| JP | 2010-191155 A | 9/2010 |
| JP | 2011243187 A * | 12/2011 |
| WO | 2007/119818 A1 | 10/2007 |
| WO | 2009/054137 A1 | 4/2009 |

OTHER PUBLICATIONS

Communication dated Nov. 18, 2015 from the State Intellectual Property Office of the P.R.C. in counterpart application No. 201280006617.3.

Communication dated May 5, 2015 from the State Intellectual Property Office of the People's Republic of China in counterpart application No. 201280006617.3.

* cited by examiner

INFORMATION TERMINAL, POWER SAVING METHOD IN INFORMATION TERMINAL DETECTING PROBABILITY OF PRESENCE OF A HUMAN OR CHANGE IN POSITION, AND RECORDING MEDIUM WHICH RECORDS PROGRAM

CROSS REFERENCE TO RELATED APPLICATIONS

This is a National Stage of International Application No. PCT/JP2012/051733, filed Jan. 20, 2012, claiming priority from Japanese Patent Application No. 2011-016186, filed Jan. 28, 2011, the contents of all of which are incorporated herein by reference in their entirety.

TECHNICAL FIELD

The present invention relates to an information terminal equipped with a camera, a power saving method in the information terminal, and a recording medium which records a program.

BACKGROUND ART

An information providing device which provides various information when a human being is detected by a human detection sensor is realized. When the human detection sensor is always kept in on-state in such information providing device, there is a case when electric power may be consumed wastefully. For this reason, a device which considers power saving of the human detection sensor is contrived.

For example, in patent document 1, an information system which suppresses consumption of a battery for the sensor by, after the human detection sensor reacted, stopping the sensor for a predetermined time, and after the predetermined time has passed, making the sensor operate once again is disclosed.

CITATION LIST

Patent Document

[Patent document 1] Japanese Patent Application Laid-Open No. 2006-245879

SUMMARY OF INVENTION

Technical Problem

However, the information system of patent document 1 is one which turns off the power supply of the sensor uniformly for only the predetermined time when the sensor detects a human being, and there is a problem that a human being is not detected at all even if he/she is in the neighborhood while the power supply is off. For this reason, realization of a mechanism by which power consumption related to human detection can be efficiently suppressed is desired.

The present invention has been made in view of the problem mentioned above and the object is to provide an information terminal, a power saving method in the information terminal and a recording medium which records a program characterized by efficiently suppressing power consumption related to human detection.

Solution to Problem

The present invention is an information terminal characterized by being the information terminal equipped with a camera, and including: human detection unit for performing human detection processing using a captured image by the camera; position change detection unit for acquiring information related to a change in a position of the information terminal concerned; and control unit for performing power control for the camera on the basis of at least one of the processing result by the human detection unit and the information related to the change in the position of the information terminal concerned from the position change detection unit.

The present invention is a power saving method of a portable terminal characterized by being the power saving method of an information terminal equipped with a camera, and including: performing human detection processing using a captured image by the camera; acquiring information related to a change in a position of the information terminal concerned; and performing power control for the camera on the basis of at least one of the human detection processing result and the information related to the change in the position of the information terminal concerned.

The present invention is a recording medium which records a program characterized by making a computer connected to a camera execute: human detection processing using a captured image by the camera; processing for acquiring information related to a change in a position of the information terminal concerned; and control processing for performing power control for the camera on the basis of at least one of the human detection processing result and the information related to the change in the position of the information terminal concerned.

Advantageous Effects of Invention

According to the present invention, power consumption related to human detection can be efficiently suppressed.

DESCRIPTION OF EMBODIMENTS

Exemplary Embodiment 1

Hereinafter, an exemplary embodiment 1 of the present invention will be explained with reference to drawings. An information terminal according to this exemplary embodiment includes: a mobile phone, a portable terminal, a small sized information terminal and so on.

Figure 1:
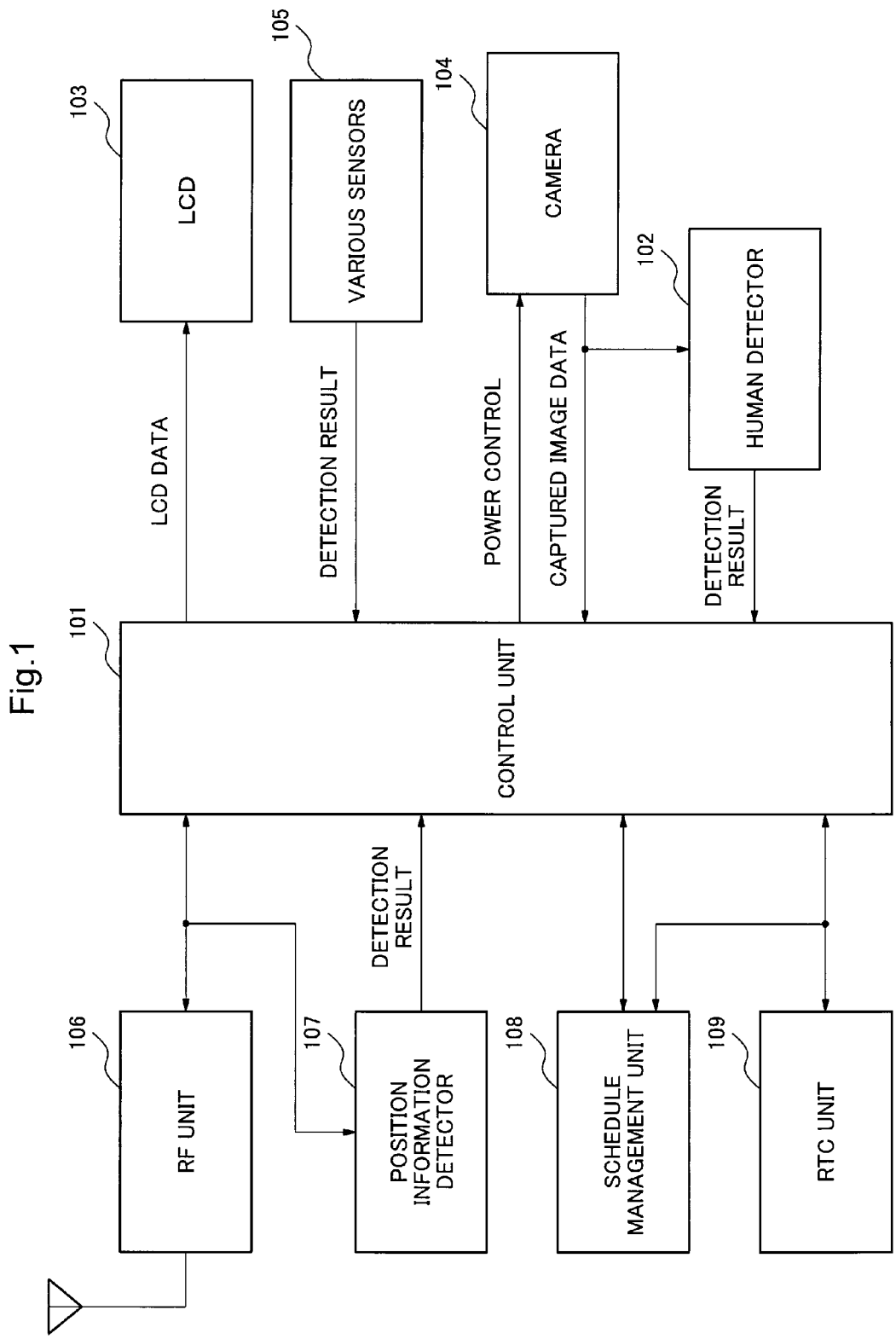
FIG. 1 is a block diagram of an information terminal according to an exemplary embodiment 1 of the present invention.

FIG. 1 is a block diagram of an information terminal according to the exemplary embodiment of the present invention.

As shown in FIG. 1, the information terminal includes: a control unit 101, a human detector 102, an LCD (Liquid Crystal Display) 103, a camera 104, various sensors 105, an RF (Radio Frequency) unit 106, a position information detector 107, a schedule management unit 108 and an RTC (Real Time Clock) unit 109.

The control unit 101 controls the whole information terminal. The control unit 101 performs power control for the camera 104 on the basis of notification from the various sensors 105, the position information detector 107 and the schedule management unit 108. The control unit 101 receives a mail to one's self and various information including useful information and so on from the RF unit 106 and stores them in a memory inside the control unit 101. When predetermined information (such as useful information) is received via the RF unit 106, the control unit 101 powers on the camera. In case it is determined by human detection processing by the human detector 102 that a human being exists in the neighborhood of the information terminal concerned, the control unit 101 supplies predetermined data, information and so on to the LCD 103, and makes them displayed. As an example of this data or information, promotional advertising data memorized in a memory in advance, predetermined information received via the RF unit 106 (useful information such as bargain information and shopping information) and so on can be mentioned. The control unit 101 refers to a time slot human detection counter which the schedule management unit 108 manages, and searches a time slot when human detection frequency is high. In order to power on (power up) the camera 104 within the searched time slot (for example, at start time of the time slot), the control unit 101 sets an alarm in the schedule management unit 108. Also, the control unit 101 refers to the time slot human detection counter, and searches a time slot when human detection frequency is low. In order to power off (power down) the camera 104 within the searched time slot (for example, at start time of the time slot), the control unit 101 sets an alarm in the schedule management unit 108.

The human detector 102 is composed of a DSP (Digital Signal Processor) and so on, performs human detection processing using an image photographed by the camera 104, and notifies the control unit 101 when a human being is detected. A processing method used as a human detection processing method is arbitrary, and for example, a human detection method using such as an HOG (Histograms of Oriented Gradients) characteristics or time-space characteristics may be used. Execution timing of the human detection processing can be set arbitrarily. For example, when the control unit 101 powers on the camera 104 on the basis of the notification from the various sensors 105, the position information detector 107 and the schedule management unit 108, it may direct the human detector 102 to execute. Also, the human detector 102 may detect that the camera 104 is powered on, and be executed.

The various sensors 105 include sensors which are generally loaded on the mobile phone or the small sized information terminal, and for example, include: an acceleration sensor, a magnetic field sensor, a gyroscope sensor, an altimeter, an ultrasonic sensor, and an open/close sensor of lid. In case a change in a state is detected from a sensor output value, the various sensors 105 notify the control unit 101. The control unit 101 detects this notification by an interrupt, accesses the sensor of notification origin, acquires sensor information such as the sensor output value and detects the change in position information. For example, from the acceleration sensor, notification of a change such as tilt, move, vibration and impulse is received. Also, from the magnetic field sensor, notification of a change in direction is received. From the open/close sensor of lid, notification of a change in the open/close state of lid is received.

The RF unit 106 demodulates data received from an antenna, and in case position information of the information terminal is detected in the data demodulated, notifies the position information detector 107 of the position information. Also, in case a message to one's self is detected in the demodulated data, the RF unit 106 notifies the control unit 101 of the message. The RF unit 106 corresponds, for example, to a cellular phone network, a GPS (Global Positioning System), a Bluetooth (registered trademark), a wireless LAN (Local Area Network), a WiMAX and so on.

The position information detector 107 possesses an area which stores the position information delivered from the RF unit 106 and compares new position information and previous position information which is already stored. The position information detector 107 compares the previous position information and the present position information received newly, and when they disagree, notifies the control unit 101 of the effect.

The schedule management unit 108 includes a counter (human detection total counter) which counts up each time in case a human being is detected in the human detection processing by the human detector 102. Further, the schedule management unit 108 includes a counter (time slot human detection counter) which counts a number of times when a human being is detected for each time slot set in advance. The time slot human detection counter is provided for each time slot which divided 1 day (24 hours) into arbitrary time slots. When the control unit 101 receives notification of human detection from the human detector 102, it makes the human detection total counter count up. At the same time, the control unit 101 may makes the relevant time slot human detection counter count up on the basis of time information acquired from the RTC unit 109. Also, when the control unit 101 makes the human detection total counter count up, it may store the time information acquired from the RTC unit 109 in a memory area, and on the basis of this time information, the schedule management unit 108 may make the relevant time slot human detection counter count up. The schedule management unit 108 notifies the control unit 101 of the alarm for powering on/off the camera 104 at time when the alarm is set by the control unit 101.

Next, operation of the information terminal according to this exemplary embodiment will be explained.

Figure 2:
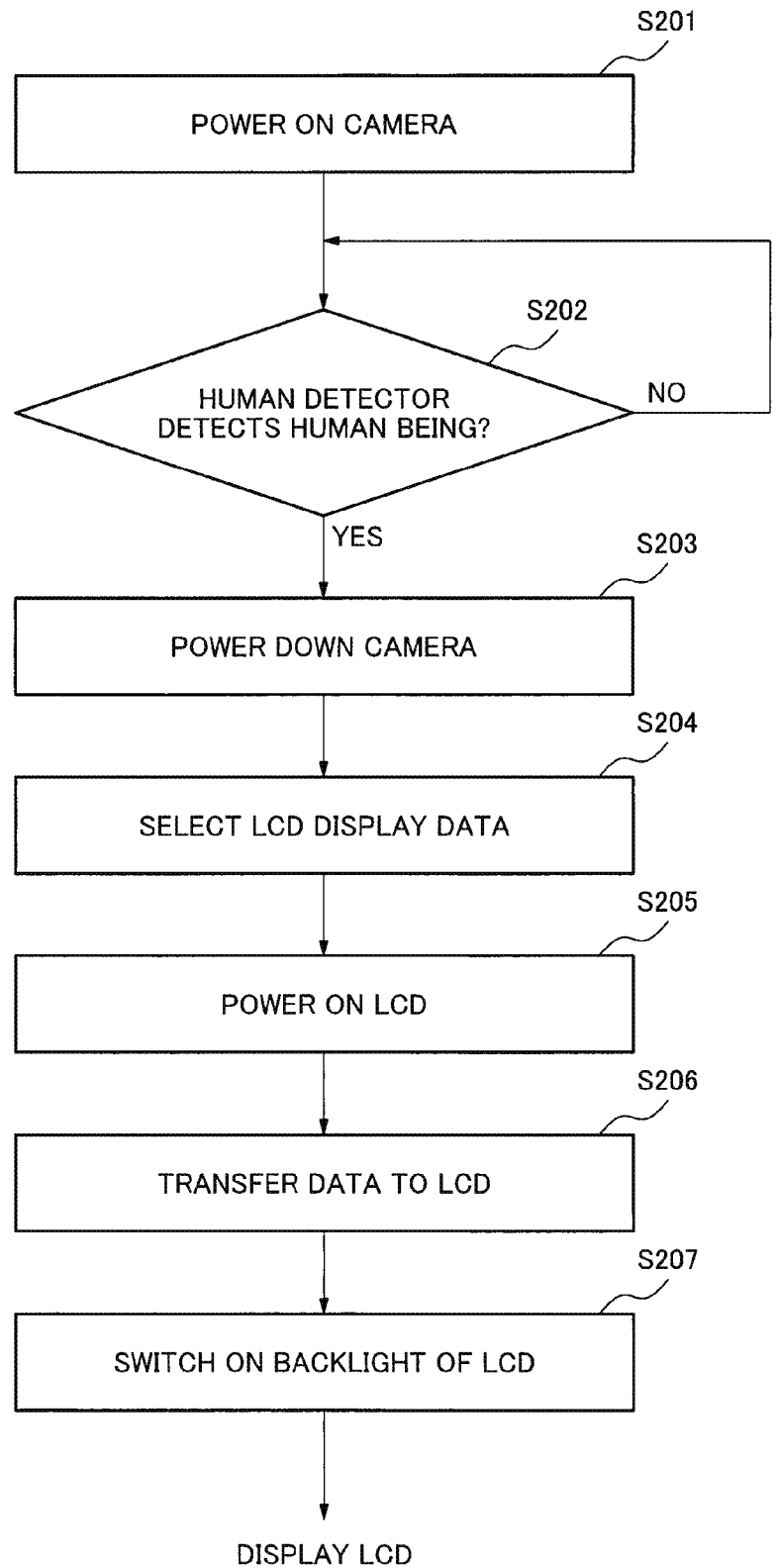
FIG. 2 is a flow chart for explaining operation of an information terminal.

First, operation from the information terminal performs human detection processing using the camera until information is displayed on the basis of the processing result will be explained with reference to FIG. 2.

The control unit 101 performs power on control for the camera 104 (Step S201).

The human detector 102 performs human detection processing using an image photographed by the camera 104 which was powered on (Step S202). The human detector 102 detects a human being walking from the far place to the direction of one's self terminal or a human being who stops in front of the one's self terminal using the human detection method, for example, such as the HOG characteristics and the time-space characteristics.

When a human being is detected by the human detector 102 (Step S202: YES), the control unit 101 performs power down control for the camera 104 (Step S203).

The control unit 101 selects data for LCD display (Step S204). Data for LCD display includes: data for sales promotions memorized in advance, image data received via a network, message data to an individual such as a mail (bargain information, shopping information) and so on. The control unit 101 may select suitable LCD display data, for example, according to the notification status from the various sensors 105, the RF unit 106, the position information detector 107 and the schedule management unit 108. For example, in case the control unit 101 receives a newly arrived message to an individual from the RF unit 106, and this message is judged to be useful information (bargain information, shopping information), may select the received message as the data for LCD display. Further, a determination method of whether the received message is useful information is arbitrary, and for example, it may be judged from attribute information such as a title of the message, or by searching a predetermined keyword such as "bargain information" or "shopping information" from a body of the message. Also, in case a change in the position information is notified from the position information detector 107, the control unit 101 searches and acquires the present position and bargain information or shopping information of a store in the neighborhood via a network, and may select the information as the data for LCD display.

The control unit 101 performs power on control for the LCD 103 (Step S205).

The control unit 101 transfers the data to the LCD 103 (Step S206).

The control unit 101 performs power on control for a backlight of the LCD 103 (Step S207). As a result, the data is displayed on the LCD 103.

Next, power saving control processing related to the power on control (Step S201) of the camera 104 in the processing operation mentioned above will be explained.

Figure 3:
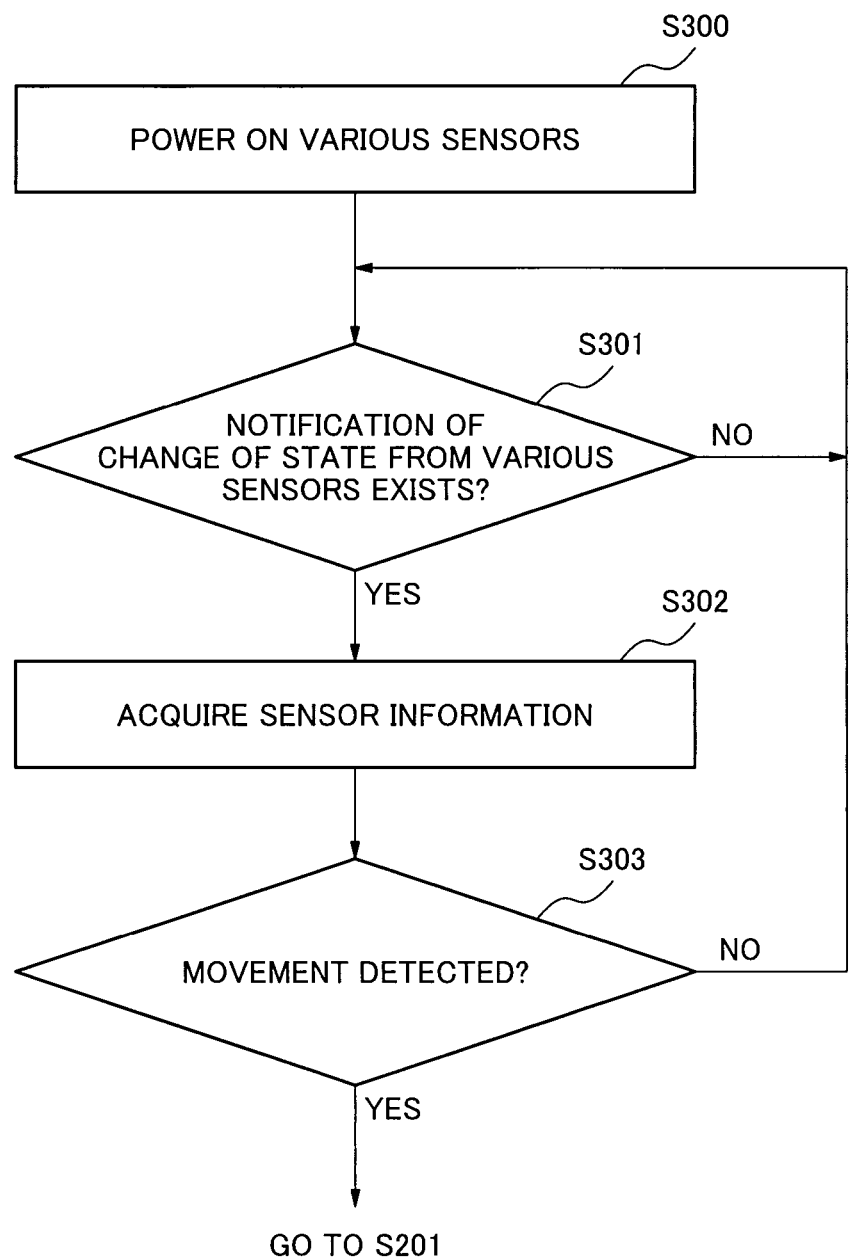
FIG. 3 is a flow chart for explaining power saving control processing on the basis of an output result of various sensors.

First, power saving control processing on the basis of an output result of the various sensors 105 will be explained with reference to FIG. 3.

First, the control unit 101 powers on the various sensors 105 (Step 300).

In case a notification from the various sensors 105 which shows a change in state is detected by an interrupt (Step S301: YES), the control unit 101 acquires sensor information from the sensor of notification origin (Step S302).

The control unit 101 performs movement detection on the basis of the acquired sensor information (Step S303). In case the control unit 101 detects movement (Step S303: YES), the processing goes to Step S201 of FIG. 2, and the control unit 101 performs power on control for the camera 104. For example, by the control unit 101 detecting tilt, move, vibration, impulse and so on from the sensor information of the acceleration sensor, detecting a change in the direction from the sensor information of the magnetic field sensor, or detecting a change in the open/close state from the sensor information of open/close of lid, it may be judged that movement of the terminal concerned is detected. Or, conditions for determining that the terminal concerned had moved may be decided concerning the sensor information from each sensor, and whether the information terminal concerned has moved may be determined with reference to this determination conditions. In case the control unit 101 does not detect movement (Step S303: NO), the processing returns to Step S301.

Further, after going to Step S201, the camera 104 is powered on as mentioned above. And, when a human being is detected, the data for LCD display selected by the control unit 101 is outputted to the LCD 103, and is announced (advertised) to the human being who exists in the environment.

Figure 4:
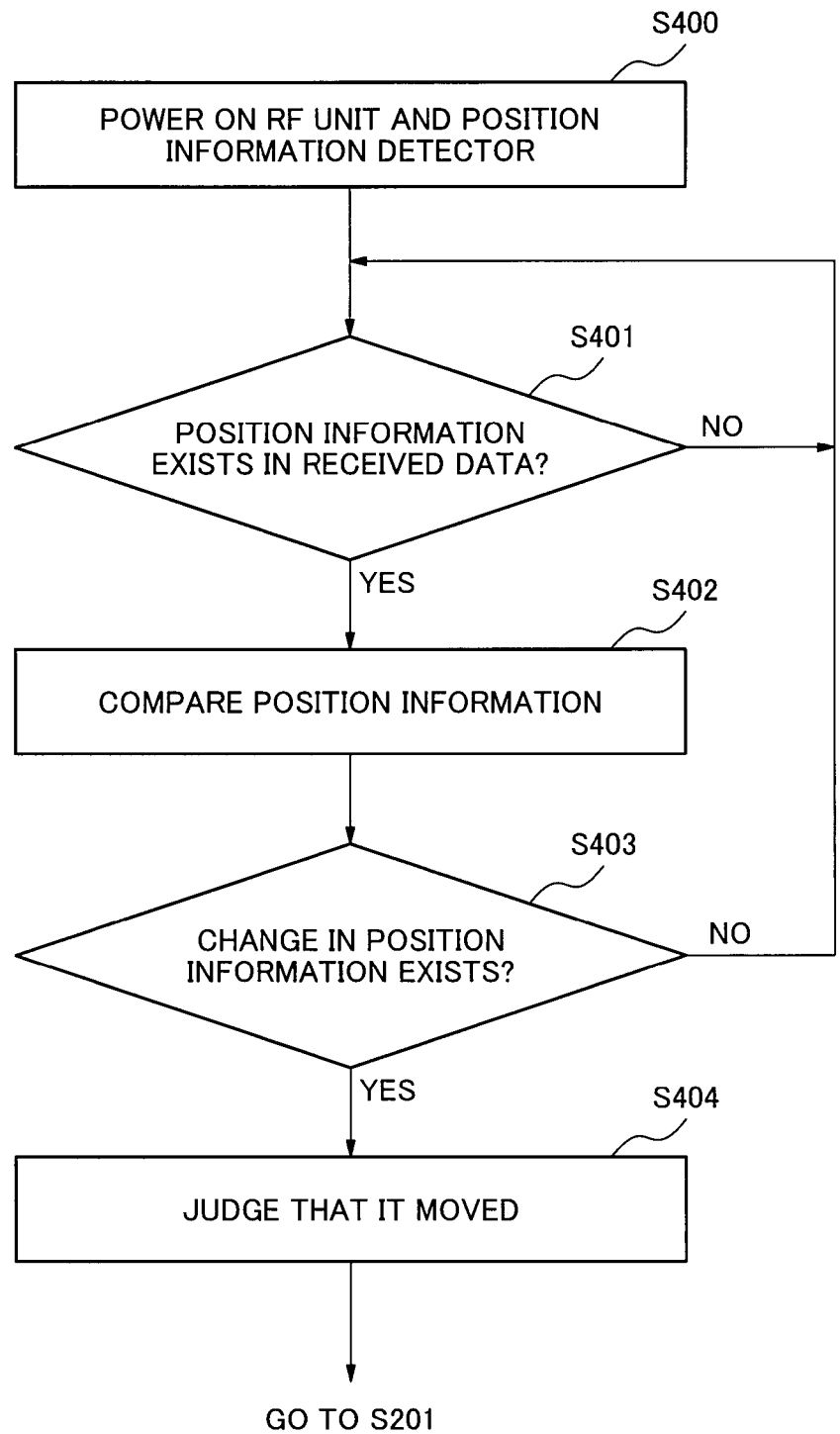
FIG. 4 is a flow chart for explaining power saving control processing on the basis of position information received from an RF unit.

Next, power saving control processing on the basis of the position information received from the RF unit 106 will be explained with reference to FIG. 4.

First, the control unit 101 powers on the RF unit 106 and the position information detector 107 (Step 400). As a result, the RF unit 106 starts demodulation processing of the received data.

The RF unit 106 detects position information concerning the received data which was demodulated. In case the position information exists in the received data, the RF unit 106 detects the position information and notifies the control unit 101 of the detected position information, and at the same time, notifies the position information detector 107 that the position information was received (Step S401).

The position information detector 107 compares the position information which is previously received in the memory area and the position information currently received (Step S402).

In case it is determined that there exists a change in the position information as a result of comparison in Step S402 (Step S403: YES), the position information detector 107 notifies the control unit 101 of the effect. Determination standard of whether there exists a change in the position information can be set arbitrarily, and for example, the position information detector 107 may determine that there exists a change in the position information when the position information compared does not agree. Also, in case an amount of the position information change between the previous position information and the current one is no smaller than a predetermined value, the position information detector 107 may determine that there exists a change in the position information. Also, in case the position information detector 107 determines that there exists no change in the position information (Step S403: NO), the processing returns to Step S401.

In case the position information change notification from the position information detector 107 is received, the control unit 101 judges that one's self terminal has moved (Step S404) and the processing goes to Step S201.

Further, after going to Step S201, the camera 104 is powered on by the control unit 101 as mentioned above. When a human being is detected, the data for LCD display selected by the control unit 101 is outputted to the LCD 103, and is announced (advertised) to the human being who exists in the environment. Also, according to the change in the position information, the control unit 101 may display the present position information on the LCD 103, or may collect store information in the neighborhood via a network and display it on the LCD 103.

Figure 5:
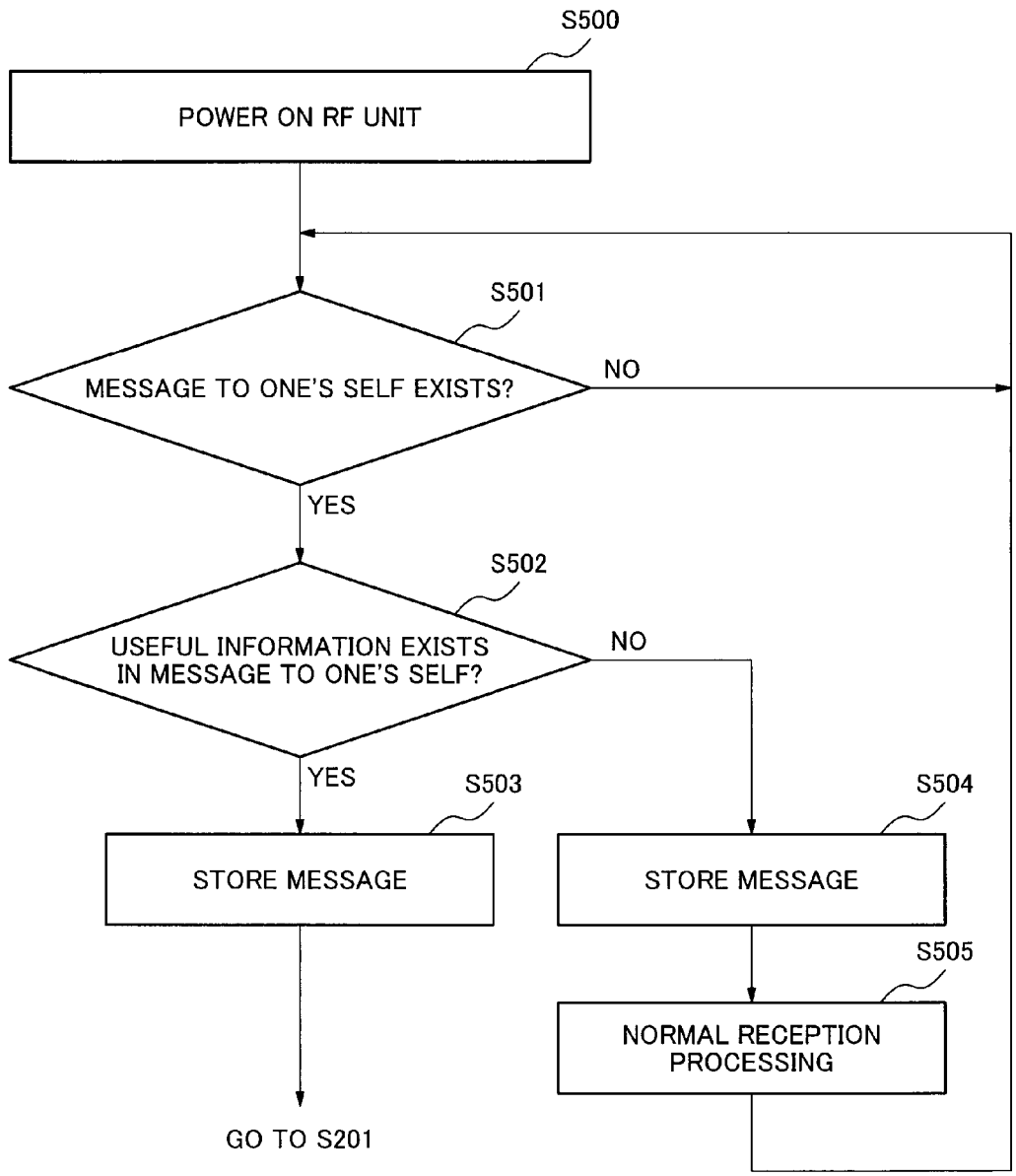
FIG. 5 is a flow chart for explaining power saving control processing on the basis of a message to one's self received from an RF unit.

Next, power saving control processing on the basis of a message to one's self received from the RF unit 106 will be explained with reference to FIG. 5.

First, the control unit 101 powers on the RF unit 106 and the position information detector 107 (Step 500). As a result, the RF unit 106 starts demodulation processing of the received data.

The RF unit 106 detects a message to one's self concerning the received data which was demodulated. In case a message to one's self exists in the received data, it detects the message to one's self, and notifies the control unit 101 (Step S501).

The control unit 101 determines whether useful information exists in the received message to one's self (Step S502). Here, the useful information is predetermined information set in advance, and for example, may be a direct mail or a mail magazine delivered from a store and so on, or a mail which a user has judged that it is useful and which is registered in advance. A determination method of whether the useful information exists can be set arbitrary, and for example, it may be coped with by filtering a mail title or a sending address, or the user may set a judgment condition of the useful information in advance.

In case it is determined that useful information exists (Step S502: YES), the control unit 101 stores the message to one's self in the memory (Step S503) and goes to Step S201.

In case it is determined that useful information does not exist (Step S502: NO), the control unit 101 stores the message to one's self in the memory (Step S504) and executes normal reception processing (Step S505). The normal reception processing is reception processing in general; is processing, for example, for rumbling a ringtone, vibrating a vibrator, lighting up an incoming call LED, and lighting up or flashing an icon display which shows that a mail was received on a screen of the LCD 103; and other than these, may also perform processing set by the user.

Further, after going to Step S201, the camera 104 is powered on by the control unit 101 as mentioned above. And, when a human being is detected by the human detector 102, the data for LCD display selected by the control unit 101 is outputted to the LCD 103, and is announced (advertised) to the human being who exists in the environment.

Figure 6:
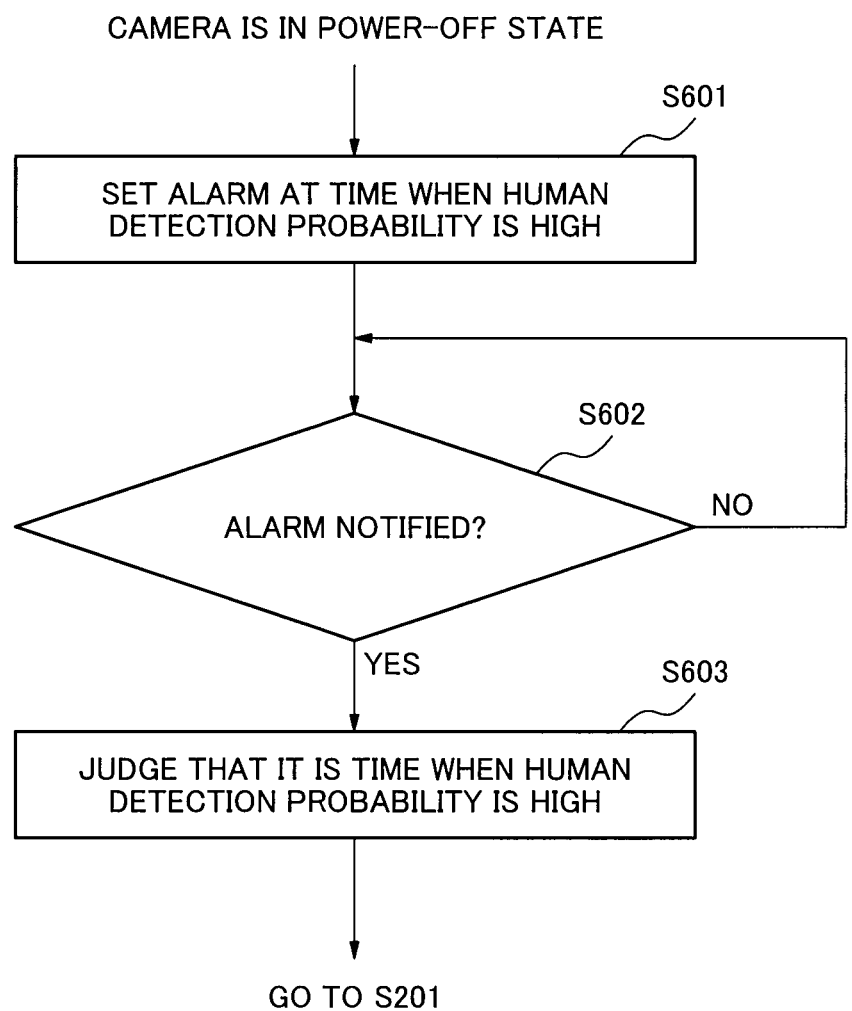
FIG. 6 is a flow chart for explaining power saving control processing (power-on control for a camera) on the basis of a human detection processing result.

Next, power saving control processing on the basis of the human detection processing result will be explained. First, processing when the camera 104 is in power-off state will be explained with reference to FIG. 6.

The control unit 101 acquires present time from the RTC unit 109 at a predetermined timing, and searches a time slot which is the time slot nearest to the present time and when the human detection probability is high. And, when the time slot is arrived, the control unit 101 performs an alarm setting for powering on the camera 104 to the schedule management unit 108 (Step S600). The schedule management unit 108 includes a detection frequency table in which state information which shows high or low of the human detection probability concerning each time slot is stored, and when the time slot when the human detection probability is high is searched, it may be performed by referring to this human detection frequency table.

The control unit 101 determines whether the alarm set in Step S600 is notified from the schedule management unit 108 (Step S601). The control unit 101 can detect the alarm notification, for example, by detecting the notification from the schedule management unit 108 by an interrupt. In case the alarm set in Step S600 is detected (Step S601: YES), the control unit 101 judges that the time slot when the human detection probability is high is arrived (Step S602), and goes to Step S201.

Further, after going to Step S201, the camera 104 is powered on as mentioned above. And, when a human being is detected by the human detector 102, the data for LCD display selected by the control unit 101 is outputted to the LCD 103, and is announced (advertised) to the human being who exists in the environment.

Also, while the alarm notification is being waited for in Step S601, the control unit 101 may power on/power off the camera 104 by an arbitrary cycle time.

Figure 7:
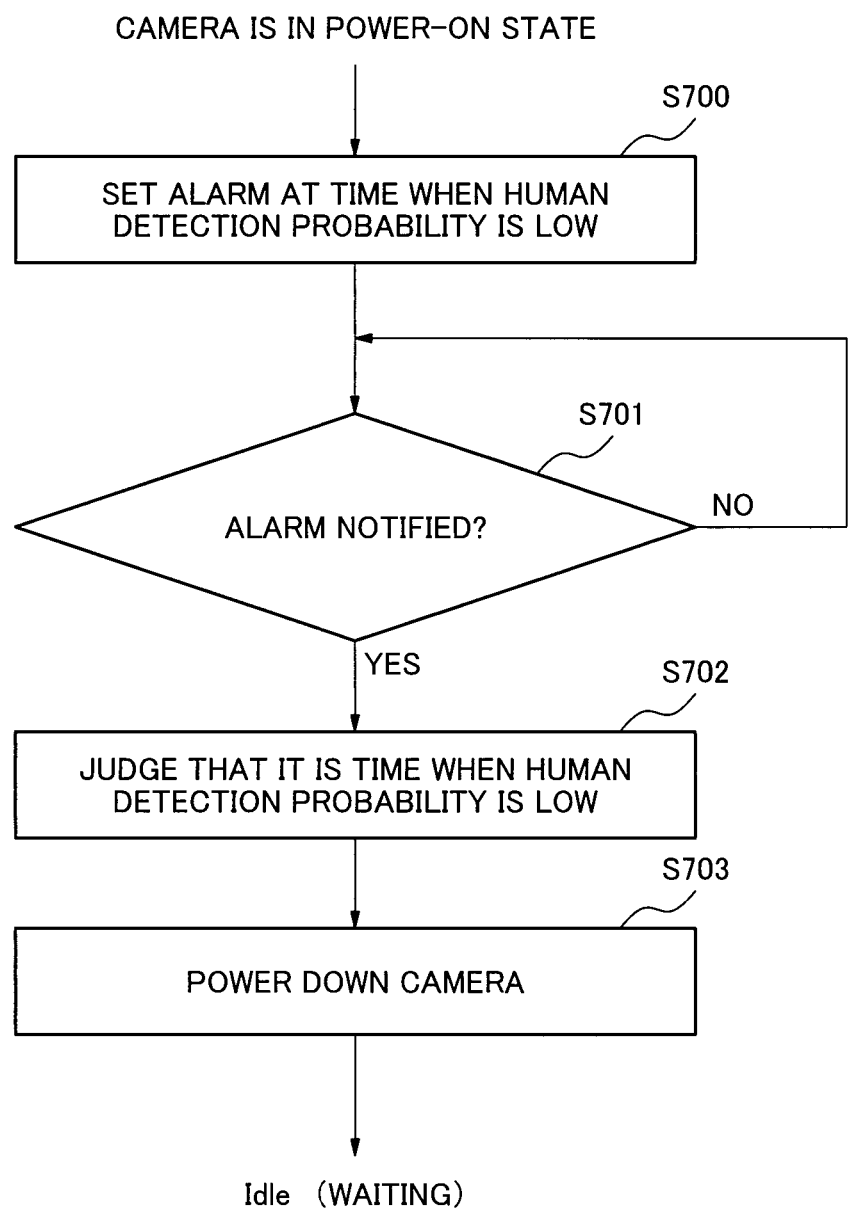
FIG. 7 is a flow chart for explaining power saving control processing (power-off control for a camera) on the basis of a human detection processing result.

Next, processing when the camera 104 is in power-on state will be explained with reference to FIG. 7.

The control unit 101 acquires present time from the RTC unit 109 at a predetermined timing, and searches a time slot which is nearest to the present time and the human detection probability is low. The control unit 101 performs an alarm setting for powering off the camera 104 when the searched time slot is arrived to the schedule management unit 108 (Step S700). When the control unit 101 searches the time slot when the human detection probability is low, it may be performed by referring to the human detection frequency table mentioned above.

The control unit 101 determines whether the alarm set in Step S700 is notified from the schedule management unit 108 (Step S701). The control unit 101 can detect the alarm notification, for example, by detecting the notification from the schedule management unit 108 by an interrupt.

In case the alarm set in Step S700 is detected (Step S701: YES), the control unit 101 judges that the time slot when the human detection probability is low is arrived (Step S702). Next, the control unit 101 performs power off control for the camera 104 which is in the power-on state at present and transitions to an Idle state (waiting) (Step S703).

Figure 8:
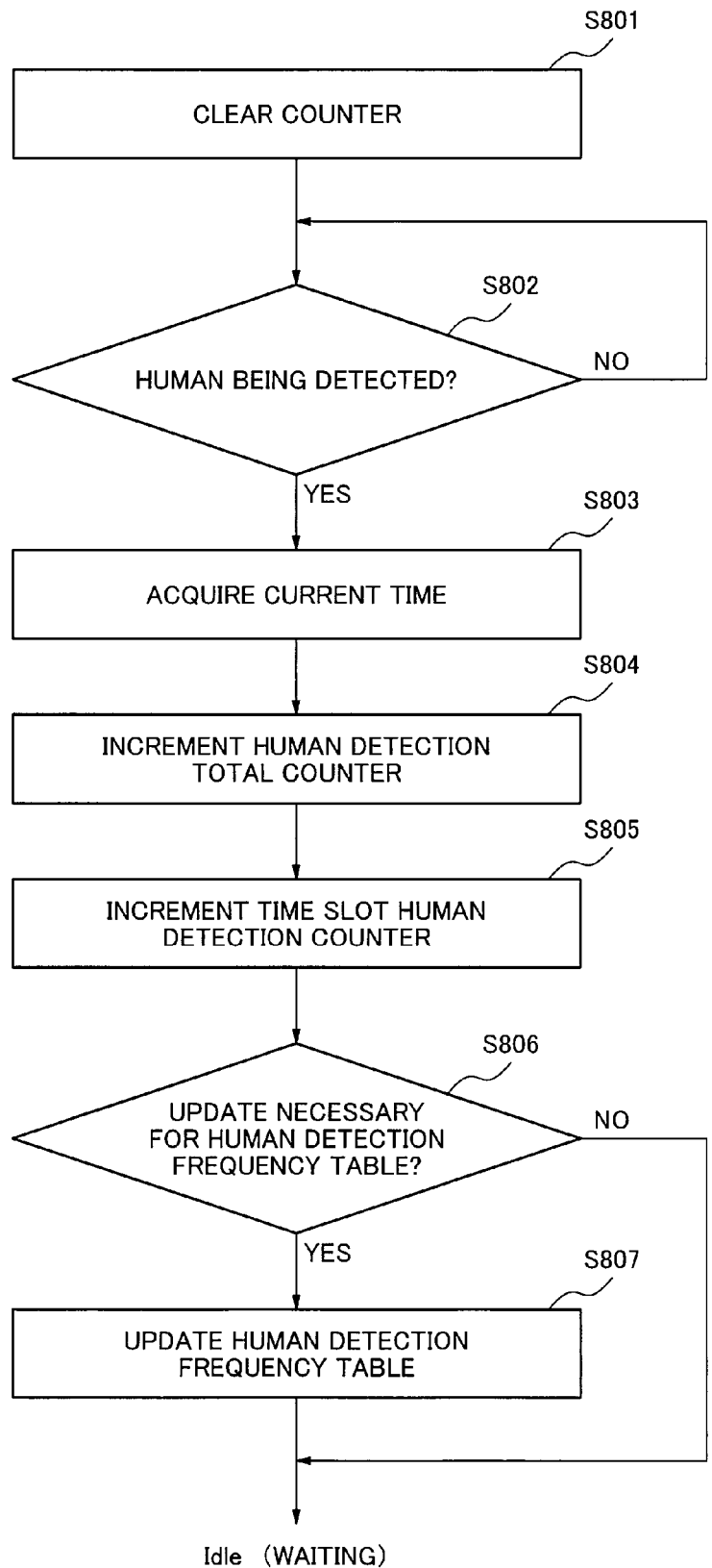
FIG. 8 is a flow chart for explaining processing which creates and updates a human detection frequency table.

Next, processing which creates/updates the human detection frequency table will be explained with reference to FIG. 8.

The control unit 101 clears the human detection total counter and the time slot human detection counter in the schedule management unit 108 (Step S801).

The control unit 101 determines whether a human being is detected by the human detector 102 (Step S802). In case a human being is detected, it is notified to the control unit 101 from the human detector 102. For example, by detecting this notification by an interrupt, the control unit 101 can judge whether a human being is detected.

In case a human being is detected (Step S802: YES), the control unit 101 acquires present time from the RTC unit 103 (Step S803).

And, the control unit 101 increments the human detection total counter in the schedule management unit 108 by only 1 (Step S804). Also, the control unit 101 increments the time slot human detection counter which corresponds to the present time by only 1 (Step S805). For example, when the present time acquired in Step S803 is 19:13, the control unit 101 adds 1 to the counter of the time slot separated by 19:00-21:00.

Since the human detection total counter and the time slot human detection counter were updated, the control unit 101 determines whether update of the human detection frequency table is needed (Step S805). The human detection frequency table includes, for example, information of state which shows high or low of the human detection probability concerning each time slot. A determination method of whether update of the human detection frequency table is needed or not is arbitrary. For example, the control unit 101 defines as human detection probability=(time slot human detection counter)/(human detection total counter), and the human detection probability is calculated concerning each time slot. And, the control unit 101 defines a threshold value which determines that the human detection probability is high as 0.05, and determines whether the human detection probability which is calculated concerning each time slot is higher than the threshold value of 0.05 or not. And, concerning the time slot which is higher than the threshold value, determination result that the human detection probability is high is obtained. Further, the determination result and setting contents of the human detection frequency table (state of whether the human detection probability is high or not concerning each time slot) are compared, and in case there exists one which does not agree, the control unit 101 determines that update of the human detection frequency table is needed.

Similarly, the control unit 101 defines a threshold value which determines that the human detection probability is low as 0.001, and determines whether the human detection probability which is calculated concerning each time slot is lower than 0.001 or not. And, concerning the time slot which is lower than the threshold value, determination result that the human detection probability is low is obtained. Further, the determination result and setting contents of the human detection frequency table (state of whether the human detection probability is low or not concerning each time slot) are compared, and in case they do not agree, the control unit 101 determines that update of the human detection frequency table is needed. When it is needed to update the human detection frequency table (Step S806: YES), the processing goes to Step S807, and when it is not needed to update (Step S806: NO), the processing transitions to the Idle (waiting) state.

In Step S807, the control unit 101 updates the human detection frequency table. Specifically, for example, in case there is disagreement concerning the state of whether the human detection probability is high or not, the control unit 101 reflects the current determination result concerning the state (whether the human detection probability is high or not) of the relevant time slot. Also, in case there is disagreement concerning the state of whether the human detection probability is low or not, the control unit 101 reflects the current determination result concerning the state (whether the human detection probability is low or not) of the relevant time slot. After the human detection frequency table is updated, the processing transitions to the Idle (waiting) state.

Further, the processing to create/update the human detection frequency table mentioned above may be made such that, for example, the schedule management unit 108 performs calculation processing by an internal circuit and performs needed update of the human detection frequency table.

As described above, according to this exemplary embodiment, on the basis of the human detection processing result, position change in the information terminal and so on, and by powering on the camera at the time when the possibility that a human being exists in the neighborhood of the information terminal is high, power consumption can be efficiently suppressed. Also, in case the control unit 101 received useful information via the RF unit 106, by powering on the camera and performing the human detection processing, it becomes possible to efficiently notify advertisement and so on to the human being who stays in the environs. Also, without a special device and by a structure of a portable terminal in general, it is possible to realize the human detection function and so on in consideration of power saving.

Exemplary Embodiment 2

Next, an exemplary embodiment 2 of the present invention will be explained with reference to FIG. 9 and FIG. 10.

(Structure)

Figure 9:
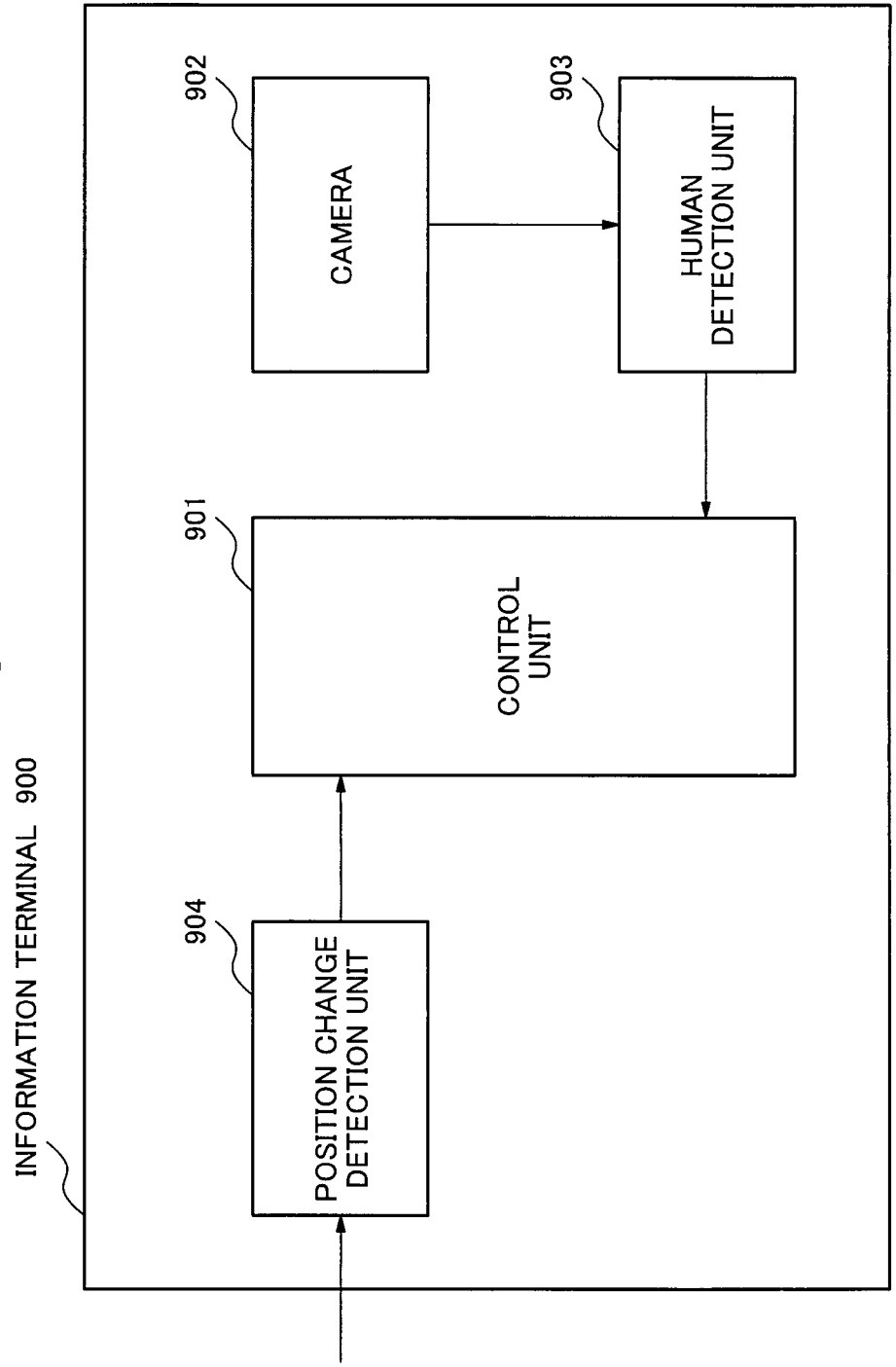
FIG. 9 is a block diagram for showing an exemplary configuration of an information terminal according to an exemplary embodiment 2.

FIG. 9 is a figure showing an exemplary configuration of an information terminal 900 according to the exemplary embodiment 2. According to FIG. 9, the information terminal 900 includes control unit 901, a camera 902, human detection unit 903 and position change detection unit 904.

The camera 902 may be a camera in general which can photograph a motion picture.

The human detection unit 903 performs human detection processing using a captured image by the camera 902.

The position change detection unit 904 acquires information related to a change in a position of the information terminal 900.

The control unit 901 performs power control for the camera 902 on the basis of at least one of the processing result by the human detection unit 903 and the information related to the change in the position of the information terminal 900 from the position change detection unit 904.

(Operation)

Figure 10:
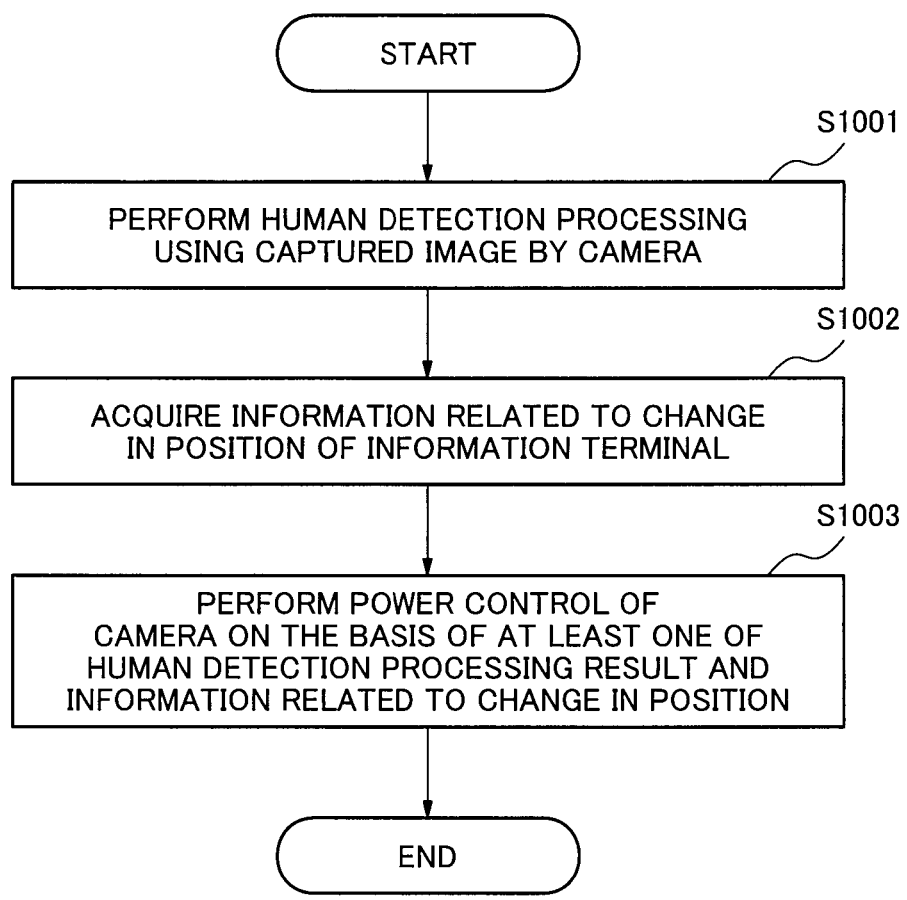
FIG. 10 is a flow chart for showing operation of an exemplary embodiment 2.

Next, by referring to the flow chart of FIG. 10, operation according to the exemplary embodiment 2 is explained.

First, the human detection unit 903 performs human detection processing using the captured image by the camera 902 (S1001).

Next, the position change detection unit 904 acquires the information related to the change in the position of the information terminal 900 (S1002).

Finally, the control unit 901 performs the power control for the camera 902 on the basis of at least one of the processing result by the human detection unit 903 and the information related to the change in the position of the information terminal 900 from the position change detection unit 904 (S1003).

Further, order of the processing of S1002 and the processing of S1001 may be exchanged.

Advantageous Effects

As described above, according to the exemplary embodiment 2, the power control for the camera is being performed on the basis of at least one of the human detection processing result and the information related to the position change in the information terminal.

Accordingly, the information terminal according to the exemplary embodiment 2 can judge time when the possibility that a human being exists in the neighborhood of the information terminal is high or time when the possibility that a human being exists in the neighborhood of the information terminal is low. Therefore, in the information terminal according to the exemplary embodiment 2, control becomes possible such as: at time when the possibility that a human being exists in the neighborhood of the information terminal is high, the camera is powered on; and at time when the possibility that a human being exists in the neighborhood of the information terminal is low, the camera is powered off. As a result, according to the information terminal according to the exemplary embodiment 2, power consumption can be efficiently suppressed.

Although the present invention has been described as above by mentioning the desirable exemplary embodiments, the present invention is not limited to the exemplary embodiments mentioned above necessarily, and it is possible to transform them variously and put them into effect within the scope of their technical idea.

Execution timing of the power control processing of the camera 104 on the basis of various information which is mentioned above with reference to FIGS. 3 to 7 can be set arbitrarily; and the execution time, the execution condition and so on may be set respectively concerning each processing, and the control unit 101 may perform the corresponding processing on the basis of the setting contents.

The information terminal according to the exemplary embodiments of the present invention mentioned above may be realized by a CPU (Central Processing Unit) by reading and executing an operation program and so on stored in a memory; or may be composed of hardware also. A function of only a part of the exemplary embodiments mentioned above can also be realized by a computer program. Also, such computer program is recorded and provided in a recording medium such as a magnetic disk or a semiconductor memory, and is read by a computer at the time of computer start up and so on. Operation of the computer is controlled in this way, and the computer is made to function as the information terminal in each exemplary embodiment mentioned above and to perform the processing mentioned above.

This application is based upon and claims the benefit of priority from Japanese patent application No. 2011-016186, filed on Jan. 28, 2011, the disclosure of which is incorporated herein in its entirety by reference.

Although part or all of the exemplary embodiments mentioned above can also be described as the following supplementary notes, but they are not limited to the followings.

(Supplementary Note 1)

An information terminal characterized by being the information terminal equipped with a camera, and including:

human detection unit for performing human detection processing using a captured image by the camera;

position change detection unit for acquiring information related to a change in a position of the information terminal concerned; and control unit for performing power control for the camera on the basis of at least one of the processing result by the human detection unit and the information related to the change in the position of the information terminal concerned from the position change detection unit.

(Supplementary Note 2)

The information terminal described in supplementary note 1, wherein characterized by the human detection processing memorizing the detection result of the human being together with information of time; and the control unit, on the basis of the memorized human detection processing result, acquiring time when a probability that the human being is detected is high, powering on the camera at the acquired time concerned, and making the human detection processing by the human detection unit executed.

(Supplementary Note 3)

The information terminal described in supplementary notes 1 or 2, wherein characterized by the position change detection unit including sensors related to detection of the position change in the information terminal concerned, and the control unit, in case an output value of the sensor shows that the information terminal concerned has moved, powering on the camera and making the human detection processing by the human detection unit executed.

(Supplementary Note 4)

The information terminal described in either one item of supplementary notes 1 to 3, wherein characterized by the position change detection unit further including a wireless reception unit; and the control unit, in case information which the wireless reception unit received shows the position change in the information terminal concerned, powering on the camera and making the human detection processing by the human detection unit executed.

(Supplementary Note 5)

The information terminal described in supplementary note 2, wherein characterized by the control unit, on the basis of the memorized human detection processing result, acquiring time when a probability that the human being is detected is low, powering off the camera at the acquired time concerned, and ending the human detection processing by the human detection unit.

(Supplementary Note 6)

A power saving method of a portable terminal characterized by being the power saving method of an information terminal equipped with a camera, and including:

performing human detection processing using a captured image by the camera;

acquiring information related to a change in a position of the information terminal concerned; and performing power control for the camera on the basis of at least one of the human detection processing result and the information related to the change in the position of the information terminal concerned.

(Supplementary Note 7)

The power saving method of the information terminal described in supplementary note 6, wherein characterized by memorizing the detection result of the human being together with information of time in the human detection processing; and on the basis of the memorized human detection processing result, acquiring time when a probability that the human being is detected is high, powering on the camera at the acquired time concerned, and making the human detection processing executed.

(Supplementary Note 8)

The power saving method of the information terminal described in supplementary notes 6 or 7, wherein characterized by the information terminal concerned including sensors related to detection of the position change in the information terminal concerned, and in case an output value of the sensor shows that the information terminal concerned has moved, powering on the camera and making the human detection processing executed.

(Supplementary Note 9)

The power saving method of the information terminal described in either one item of supplementary notes 6 to 8, wherein characterized by the information terminal further including a wireless reception unit; and in case information which the wireless reception unit received shows the position change in the information terminal concerned, powering on the camera and making the human detection processing executed.

(Supplementary Note 10)

The power saving method of the information terminal described in supplementary note 7, wherein characterized by, on the basis of the memorized human detection processing result, acquiring time when a probability that the human being is detected is low, powering off the camera at the acquired time concerned, and ending the human detection processing.

(Supplementary Note 11)

A recording medium which records a program characterized by making a computer connected to a camera execute:

human detection processing using a captured image by the camera;

processing for acquiring information related to a change in a position of the information terminal concerned; and control processing for performing power control for the camera on the basis of at least one of the human detection processing result and the information related to the change in the position of the information terminal concerned.

(Supplementary Note 12)

The recording medium which records the program described in supplementary note 11, wherein characterized by the human detection processing memorizing the detection result of the human being together with information of time; and the control processing, on the basis of the memorized human detection processing result, acquiring time when a probability that the human being is detected is high, powering on the camera at the acquired time concerned, and making the human detection processing executed.

(Supplementary Note 13)

The recording medium which records the program described in supplementary notes 11 or 12, wherein characterized by the computer being connected to sensors related to detection of the position change; and the control processing, in case an output value of the sensor shows a predetermined change in the position, powering on the camera and making the human detection processing executed.

(Supplementary Note 14)

The recording medium which records the program described in either one items of supplementary notes 11 to 13, wherein characterized by the computer being connected to a wireless reception unit; and the control processing, in case information which the wireless reception unit received shows a predetermined position change, powering on the camera and making the human detection processing executed.

(Supplementary Note 15)

The recording medium which records the program described in supplementary note 12, wherein characterized by the control processing, on the basis of the memorized human detection processing result, acquiring time when a probability that the human being is detected is low, powering off the camera at the acquired time concerned, and ending the human detection processing.

REFERENCE SIGNS LIST

101 Control unit
102 Human detector
103 LCD
104, 902 Camera
105 Various sensors
106 RF unit
107 Position information detector
108 Schedule management unit
109 RTC unit
900 Information terminal
901 Control unit
903 Human detection unit
904 Position change detection unit

The invention claimed is:

1. An information terminal, equipped with a camera, and comprising:

a human detection unit comprising a processor which detects a human being using an image captured by said camera and notifies a control unit when the human being is detected;

a memory which records information of a detection result, of detecting the human being, together with information of a time; and the control unit, which is connected with the memory, calculates a probability that the human being is detected using information of the detection result and information of the time notified from the memory, calculate a first time slot in which a probability that the human being is detected is above a threshold probability and a second time slot in which the probability that the human being is detected is below the threshold probability, the first time slot and the second time slot being calculated in advance of detecting the human being, and powers on said camera from an off state in response to a first time of the first time slot arriving, and searches the second time slot nearest to a current time based on a calculation result.

2. The information terminal according to claim 1, further comprising a position change detection unit, connected to the human detection unit, comprising a sensor that detects a change of tilt, move, vibration, impulse, magnetic field, angle, angular velocity, angular acceleration, height, reflection of ultrasonic or open/close state of a lid of said information terminal and outputs said change to said control unit, and wherein said control unit, in case an output value of said sensor indicates that the information terminal has moved, powers on said camera and controls said human detection unit to detect a human being.

3. The information terminal according to claim 2, wherein said position change detection unit further comprises a wireless reception unit; and said control unit, in case said wireless reception unit indicates that the information terminal has changed in position, powers on said camera and controls said human detection unit to detect a human being.

4. A power saving method, of an information terminal equipped with a camera, the method comprising:

performing human being detection processing to detect a human being using an image captured by said camera;

storing a detection result, of detecting the human being, together with information of a time;

calculating a probability that the human being is detected using information of the detection result and information of the time;

calculating a first time slot in which a probability that the human being is detected is above a threshold probability and a second time slot in which the probability that the human being is detected is below the threshold probability, the first time slot and the second time slot being calculated in advance of detecting the human being;

powering on said camera from an off state in response to a first time of the first time slot arriving; and searching the second time slot nearest to a current time based on a calculation result.

5. The power saving method of the information terminal according to claim 4, wherein the information terminal comprises sensors configured to detect a position change of the information terminal, and in case an output value of said sensor indicates that the information terminal has moved, powers on said camera, and executes said human being detection processing.

6. The power saving method of the information terminal according to claim 4, wherein the information terminal further comprises a wireless reception unit; and in case said wireless reception unit indicates that the information terminal has changed position, powers on said camera, and executes said human being detection processing.

7. A non-transitory computer readable recording medium comprising a program configured to instruct a computer, connected to a camera, to execute:
   human being detection processing to detect a human being using an image captured by the camera;
   storing a detection result, of detecting the human being, together with information of a time;
   calculating a probability that the human being is detected using information of the detection result and information of the time;
   calculating a first time slot in which a probability that the human being is detected is above a threshold probability and a second time slot in which the probability that the human being is detected is below the threshold probability, the first time slot and the second time slot being calculated in advance of detecting the human being;
   powering on said camera from an off state in response to a first time of the first time slot arriving; and
   searching the second time slot nearest to a current time based on a calculation result.

8. The recording medium comprising the program according to claim 7, wherein said computer is connected to sensors configured to detect a position change of an information terminal; and
   said program is further configured to instruct the computer to execute, in case an output value of the sensor indicates a predetermined change in a position of the information terminal, powering on said camera and said human being detection processing.

9. The recording medium comprising the program according to claim 7, wherein said computer is connected to a wireless reception unit; and
   said program is further configured to instruct the computer to execute, in case said wireless reception unit indicates a predetermined position change of an information terminal, powering on said camera and said human being detection processing.

* * * * *